No. 703,691. Patented July 1, 1902.
W. B. ARMSTRONG.
ELECTRIC LOG REGISTER.
(Application filed Sept. 15, 1900.)

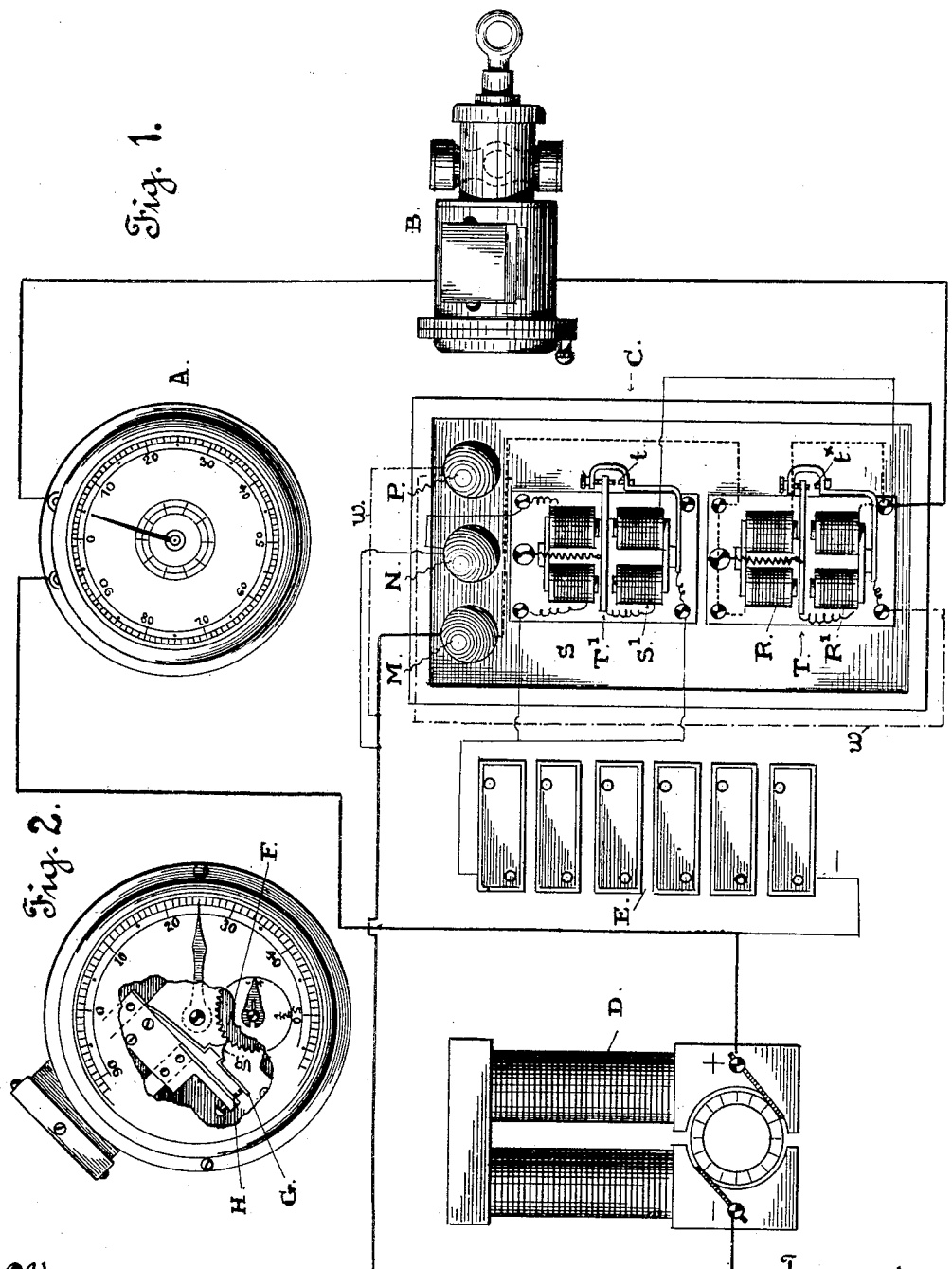

(No Model.) 3 Sheets—Sheet 2.

Witnesses.
F. E. Monteverde
E. Salomon

Inventor.
William B. Armstrong
by Smith Osborn
his attorney

THE NORRIS PETERS CO., PHOTO-LITHO., WASHINGTON, D. C.

No. 703,691. Patented July 1, 1902.
W. B. ARMSTRONG.
ELECTRIC LOG REGISTER.
(Application filed Sept. 15, 1900.)
(No Model.) 3 Sheets—Sheet 3.
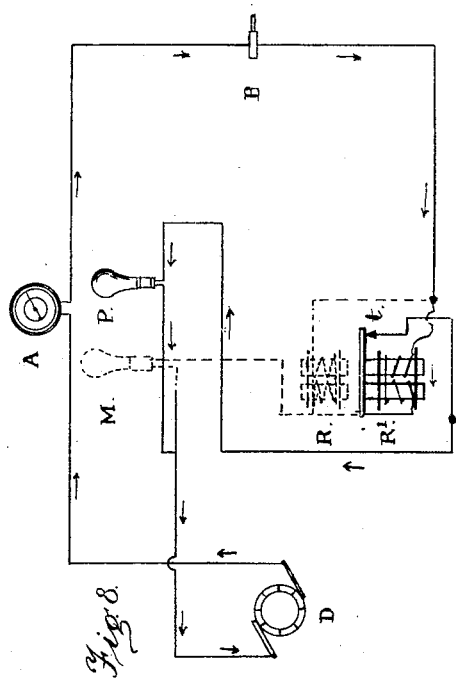
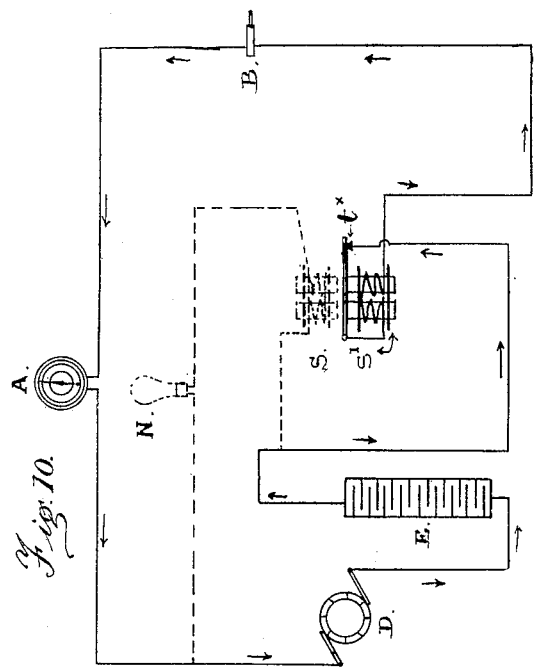
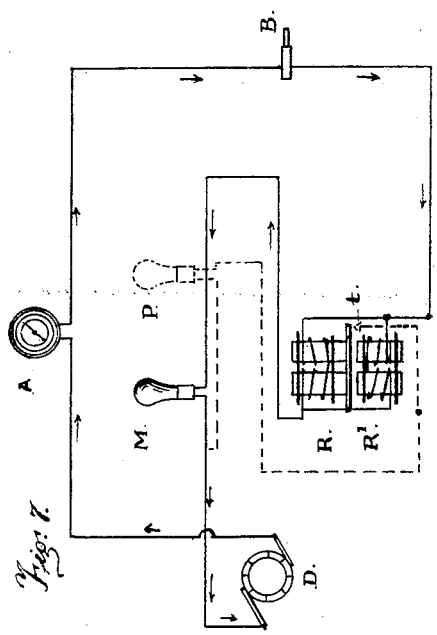
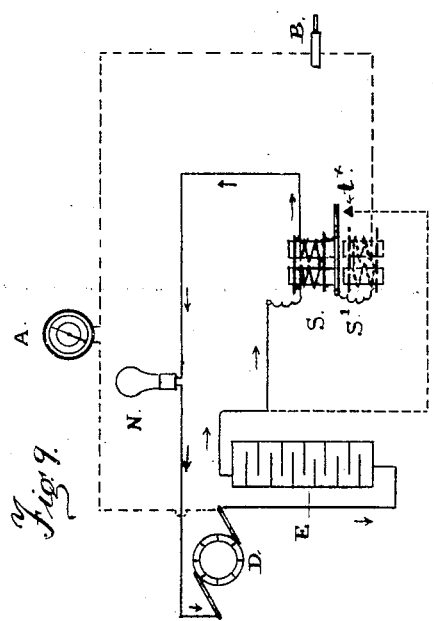
Witnesses. Inventor:
William B. Armstrong
By Smith & Osborn
Attys.

UNITED STATES PATENT OFFICE.

WILLIAM B. ARMSTRONG, OF SAN FRANCISCO, CALIFORNIA.

ELECTRIC-LOG REGISTER.

SPECIFICATION forming part of Letters Patent No. 703,691, dated July 1, 1902.

Application filed September 15, 1900. Serial No. 30,169. (No model.)

*To all whom it may concern:*

Be it known that I, WILLIAM B. ARMSTRONG, a citizen of the United States, and a resident of the city and county of San Francisco and State of California, have invented new and useful Improvements in Electric-Log Registers, of which the following is a specification.

This invention relates to means or apparatus for transmitting the readings or registrations of an electric log to any number of registers situated in different parts of the ship through which the speed made and the number of miles traveled are continuously and simultaneously registered and are displayed in various parts of the ship, such as the chart-room, the bridge, and other stations, for the information or convenience of the officers.

The objects of these improvements are mainly to secure accuracy and the necessary continuity of operation in the apparatus, to prevent the apparatus from being interrupted or deranged by accident to the operating mechanism, and to indicate to the officers and others the condition of the mechanism, whether the same be properly working in all its parts or not.

To these ends and objects my present improvements comprise certain novel parts and combination of parts producing an improved device or apparatus for transmitting and registering at one or more stations in a vessel the movements and operation of the log, as hereinafter described, and pointed out in the claims at the end of this specification.

The following description explains at length the nature of these improvements and the manner in which I proceed to produce, apply, and carry out my invention, reference being had therein to the accompanying drawings, forming part thereof.

Figure 3:
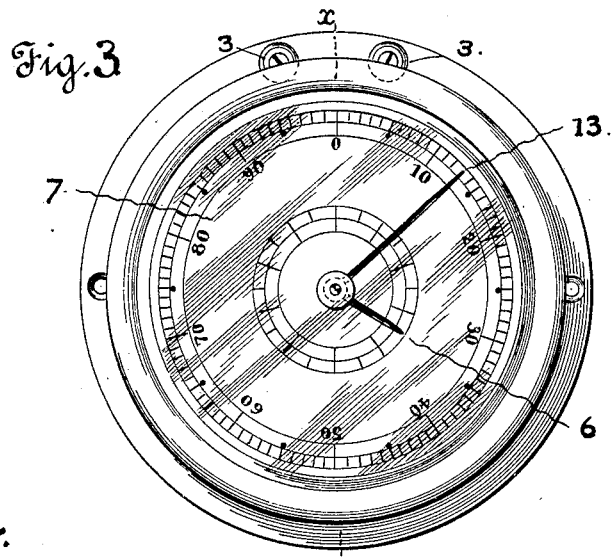
Figure 4:
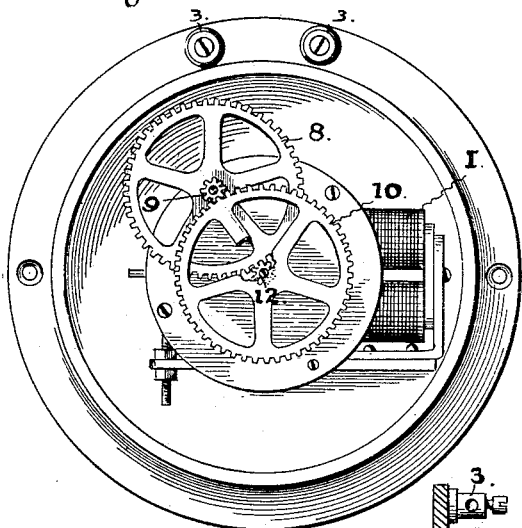
Figure 5:
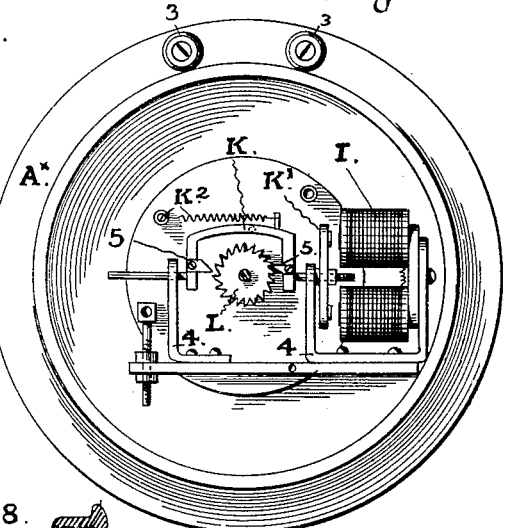
Figure 6:
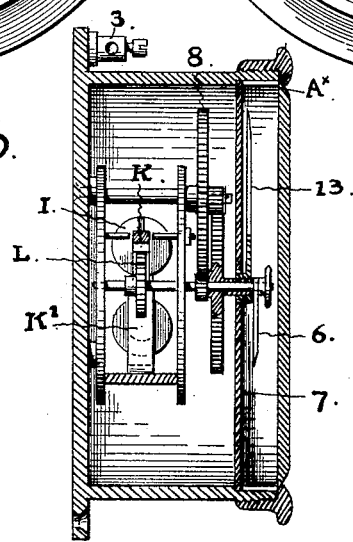

Figure 1 of the drawings referred to represents in front elevation the parts of the complete apparatus constructed and connected together for operation according to my invention and showing the ship's log, the register located at a distance from the log, a principal generator or source of electricity, such as a dynamo-electric machine, a secondary source of electrical energy, such as a storage battery, and electrically-operated indicators in the circuits between the log and the register, and the sources of electricity through a system of circuit-interrupters and circuit-selectors. Fig. 2 is a front view of the registering device to which the log is connected, the dial being broken away in part to expose the circuit-interrupters inside. Fig. 3 is a front view of the register. Fig. 4 is a front view of Fig. 3 with the dial and pointers removed to show the train of gears that actuates the pointers. Fig. 5 is a similar view with the gears and the front plate removed to expose the parts of the electrically-controlled step-by-step mechanism that actuates the gears. Fig. 6 is a transverse section on the vertical line $x\,x$, Fig. 3. Figs. 7, 8, 9, and 10 are diagrams of the electrical circuits connecting the registering devices and the indicators with a principal and a secondary source of electrical energy.

In the several figures of the drawings, A indicates one of the registers, which may be located in the chart-room or other part of the vessel; B, the registering mechanism of the ship's log; C, a case containing the circuit-controlling mechanism and the indicators of the different circuits.

D indicates an electrical generator, such as a dynamo-electric machine; and E, a secondary source of electricity, such as a storage battery. The log and the register are connected in circuit with the generator through circuits to be hereinafter described.

F is a toothed wheel on the arbor of the principal pointer. G is a contact-spring having a tooth $g$ setting in the path of the teeth on the wheel, and H is a second contact-spring, with which the contact G makes and breaks electrical contact as the teeth of the wheel F strike the spring G. The two springs G H are connected to opposite poles of the generator in such manner that electric interruptions in the circuit between the log and the register A are produced corresponding to the movements of the wheel F.

A construction of registering device well adapted for use in this apparatus is illustrated in Figs. 4, 5, and 6. The electromagnet I in this device is connected in the circuit with the interrupter or make-and-break device in the log, so as to produce movements of an armature K' in time with the revolutions of the toothed wheel on the log, and through the medium of a slidable frame K, connected to the armature K', the toothed wheel L in the register mechanism is rotated in time with the movements of the wheel driven by the log. The frame K is supported in guides 4 4 and is provided with angular teeth or pallets 5 5, which, by engaging the teeth of the wheel L upon opposite sides of its axis, rotate that wheel as the frame is moved. This reciprocating movement of the frame, as will readily be understood, is produced by the action of the armature K' and a coiled spring K², attached to the slide and to a fixed point in the case. The movements of the wheel L thus produced are registered on the dial 7 by a pointer 6 on the arbor of the toothed wheel. Through a train of gears and pinions 8 9 10 12 a longer pointer 13 is connected with the toothed wheel and is moved thereby in such relation to the movements of the shorter pointer 6 that multiples of the units or divisions on one scale on the dial are registered by the longer pointer on another scale. Any required number of these dial-registers are placed in the circuits between the log and the source of electrical energy to supply the operating-current and are connected by wires to binding-posts 3 3 on the case in which the indicators and the circuit-controlling devices are inclosed.

M N P are incandescent lamps connected in the circuits between the generator and the log and between the storage battery and the log in such manner as to indicate by their lights the condition of the several circuits and the perfect working of the mechanism. Bulbs of different colors are used in order to readily distinguish the circuits from one another. In the apparatus from which the accompanying drawings were made the indicator M shows a green light, the indicator N a white light, and the third indicator P a red light. The green lamp M is located in the circuit between the dynamo D and the log-registering mechanism, and in that circuit is included a circuit-selector, preferably formed of two pairs of electromagnets R R' with a vibrating armature T between the pairs. Through the movements of this armature and the contacts made or broken at the contact-stop $t^\times$, as attracted by one or the other of the magnets R R', a circuit through the green or the red lamp is opened and closed, the said circuits extending from one side of the dynamo through the lamp M, magnet R, log-registering mechanism B, and register to the opposite side of the dynamo, as shown in Fig. 7. In one side of the same circuit is connected, through a shunt or secondary circuit $w$, the magnet R', the red lamp P, and the stationary contact-stop $t^\times$. This last-mentioned circuit is open at $t^\times$ whenever the circuit-closer T is attracted to the second pair of magnets R', when the attractive force of that magnet exceeds the power of the magnet R. The current from the dynamo actuating the register A under such arrangement will be carried through either the green lamp M or the red lamp P when the dynamo is working. Such variation in the power of one magnet over the other is produced either by employing two magnets of different degrees of resistance or by setting the armature T in closer working relation to the poles of one magnet than to those of the other magnet. In the present construction the magnet R is adjusted to hold the armature T away from the contact-stop and carry the circuit through the green lamp M as long as the dynamo is working properly, while the branch or secondary circuit containing the red lamp P will be open at the contact-stop $t^\times$. As long as the log is working properly the green lamp M, responding to the action of the circuit making and breaking mechanism of the log, will indicate that fact by the regularity of the flashes in the lamp; but should the log cease to work or the generator fail to supply the current the lamp M will indicate the condition of things by showing a steady light without intermittent flashes in the one case and by failing to show a light in the other case. In this way the lamp M constitutes a constant indicator to show at all times the working condition of the log and the dynamo.

In the event of an accident to the lamp M, so that it fails to work properly the red lamp P will be brought into service by the current acting through the second pair R' of the circuit-selector, and the armature T being attracted thereby will close the circuit through the contact-stop $t^\times$, as shown in Fig. 8.

To prevent interruptions in the operation of the apparatus either through accident to the dynamo or when the same may stop for any reason, an auxiliary generator, such as a storage battery E, is connected with the dynamo and into the operating-circuit through a second set of electromagnets S S', controlling a circuit-closing armature T'. In this circuit, as shown in Fig. 9, is included the white lamp N, which is placed between the storage battery and the log in the same manner as the other signals are placed. The function of this signal N is to show the continuity of the charging-circuit and the fact that the storage battery is being charged. One of the magnets S is placed in a circuit including the dynamo, the white lamp N, and the storage battery, which will thus cause the lamp to indicate that the battery is being charged. The other magnet S' is placed in a circuit including the battery, the indicator, and the log. So long as the dynamo is working the current is flowing through the lamp N, the magnets S, and into the battery. This energizes the magnets S and holds the armature T' away from the contact $t$, thereby breaking the battery-circuit, which includes the log; but as soon as the dynamo ceases to work from any cause the magnets S lose their power and the armature falls upon or is drawn into engagement with the contact $t$ by a suitable spring, whereby another circuit from the battery is closed, as shown in Fig. 10, in which is located the log and the indicator. As soon, however, as the dynamo is again started the magnets S are energized, and the armature T' is withdrawn from the contact $t$, and the current flows through the circuits originally described and shown in Fig. 7, 8, and 9. In this manner the apparatus is caused to adjust and correct automatically any variations or interruptions in the electric supply that otherwise would prevent continuous and perfect action of the log-recorder, and in addition to such automatic control and adjustment of the circuit the perfect or the defective operation of both the electrical and the mechanical parts of the apparatus is at all times indicated by the visual signals.

Having thus fully described my invention, what I claim as new therein, and desire to secure by Letters Patent, is—

1. In an electrical log, a source of electrical energy, two circuits, a register and a log therein, an indicator in each circuit, means for passing a current through either of said circuits, and means for operating the indicator intermittently through said circuit.

2. In an electrical log, a source of electrical energy, two circuits, a register and a log therein, an indicator in each circuit, electrically-operated means for rendering either of said circuits operative by closing the same, the log being provided with means for intermittently opening and closing the operative circuit.

3. In an electrical log, a source of electrical energy, two circuits, a register, a log, and two sets of electromagnets therein, an armature between the sets of magnets, one of the circuits being provided with a contact in position to be engaged by said armature, whereby said circuit is closed when the other circuit is opened, and an indicator in each of said circuits.

4. In an electrical log, a primary source of electrical energy and a secondary source connected therewith, two circuits from said sources of electrical energy containing a log and a register, and means for automatically passing a current of electricity from either source through either of said circuits.

5. In an electrical log, a primary source of electrical energy and a secondary source connected therewith, electrical circuits connected with said sources, one of which is provided with an indicator and the other with a log and a register, and means for automatically passing a current from either source through the second-mentioned circuit.

6. In an electrical log, a primary source of electrical energy and a secondary source connected therewith, electrical circuits connected with said sources, one of which is provided with an indicator and the other with a log and a register, and electrically-controlled means for automatically passing a current from either source through said second-mentioned circuit.

7. In an electrical log, a primary source of electrical energy, and a secondary source connected therewith, electrical circuits connected with said sources of energy, one of which is provided with an electromagnet and the other is normally open and provided with a log, a register and a contact in position to be engaged by the armature of the magnet, whereby the second circuit may be closed when the first-mentioned circuit is opened.

8. In an electrical log, a primary source of electrical energy and a secondary source connected therewith, circuits connected with said sources of energy, the circuit connected with the primary source being provided with a log, a register, an indicator, a shunt-circuit and two electromagnets, the shunt being provided with an indicator and including an armature located between the magnets; one of the circuits from the secondary source of energy being provided with an indicator and an electromagnet, and the other circuit therefrom being normally open and including the armature of the last-mentioned electromagnet.

In testimony that I claim the foregoing I have hereunto set my hand and seal.

WILLIAM B. ARMSTRONG. [L. S.]

Witnesses:
EDWARD E. OSBORN,
GEO. T. KNOX.